(12) United States Patent
Fujii et al.

(10) Patent No.: US 6,255,011 B1
(45) Date of Patent: Jul. 3, 2001

(54) FUEL CELL STACK

(75) Inventors: Yosuke Fujii; Takafumi Okamoto; Manabu Tanaka; Akio Yamamoto; Hidemitsu Ono; Narutoshi Sugita; Masaharu Suzuki, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/517,535

(22) Filed: Mar. 1, 2000

Related U.S. Application Data

(63) Continuation-in-part of application No. 09/188,949, filed on Nov. 10, 1998, now Pat. No. 6,048,633.

(30) Foreign Application Priority Data

Mar. 2, 1998 (JP) ...................................................... 10-49304
Apr. 9, 1999 (JP) .................................................. 11-103200

(51) Int. Cl.[7] ...................................................... H01M 8/10
(52) U.S. Cl. ................................ 429/32; 429/34; 429/38; 429/39
(58) Field of Search .................................. 429/29, 14, 17, 429/32, 34, 38, 39

(56) References Cited

U.S. PATENT DOCUMENTS 5,300,370  4/1994  Washington et al. .................. 429/34

FOREIGN PATENT DOCUMENTS 6-267564  9/1994  (JP) .

OTHER PUBLICATIONS

English language abstract of JP 6–267564, Sep. 1994.

Primary Examiner—Bruce F. Bell
(74) Attorney, Agent, or Firm—Lyon Lyon LLP

(57) ABSTRACT

First gas flow passage grooves communicating with a fuel gas inlet and second gas flow passage grooves communicating with a fuel gas outlet are provided on a surface of a first separator. First and second united sections are provided at merged portions of the first gas flow passage grooves and the second gas flow passage grooves. Accordingly, the number of gas flow passage grooves is throttled from the side of the fuel gas inlet to the side of the fuel gas outlet. The turbulence is allowed to occur at the throttled portion to make it possible to improve the gas diffusion performance.

8 Claims, 8 Drawing Sheets

FUEL CELL STACK

This is a Continuation-In-Part application of Ser. No. 09/188,949, filed Nov. 10, 1998, now U.S. Pat. No. 6,048,633.

BACKGROUND OF THE INVENTION

1. Field of the Invention

The present invention relates to a fuel cell stack comprising a plurality of fuel cell units each composed of an electrolyte interposed between an anode electrode and a cathode electrode, the plurality of fuel cell units being stacked with separators intervening therebetween.

2. Description of the Related Art

For example, the solid polymer electrolyte type fuel cell comprises a fuel cell unit including an anode electrode and a cathode electrode disposed opposingly on both sides of an electrolyte composed of a polymer ion exchange membrane (cation exchange membrane), the fuel cell unit being interposed between separators. Usually, the solid polymer type fuel cell is used as a fuel cell stack comprising a predetermined number of the fuel cell units and a predetermined number of the separators which are stacked with each other.

In such a fuel cell, a fuel gas such as a gas principally containing hydrogen (hereinafter referred to as "hydrogen-containing gas"), which is supplied to the anode electrode, is converted into hydrogen ion on the catalyst electrode, and the ion is moved toward the cathode electrode via the electrolyte which is appropriately humidified. The electron, which is generated during this process, is extracted for an external circuit, and the electron is utilized as DC electric energy. An oxygen-containing gas such as a gas principally containing oxygen (hereinafter referred to as "oxygen-containing gas") or air is supplied to the cathode electrode. Therefore, the hydrogen ion, the electron, and the oxygen gas are reacted with each other on the cathode electrode, and thus water is produced.

In order to supply the fuel gas and the oxygen-containing gas to the anode electrode and the cathode electrode respectively, a porous layer having conductivity, for example, porous carbon paper is usually disposed on the catalyst electrode layer (electrode surface), and the porous layer is supported by the separator. Further, one or a plurality of gas flow passages designed to have a uniform widthwise dimension are provided on the mutually opposing surfaces of each of the separators.

In such an arrangement, the condensed water or the water produced by the reaction exists in a state of liquid (water) in the gas flow passage in some cases. If the water is accumulated in the porous layer, the diffusion performance is lowered concerning the diffusion of the fuel gas and the oxygen-containing gas to the catalyst electrode layer. It is feared that the cell performance is conspicuously deteriorated.

In view of this fact, for example, a fuel cell is known, as disclosed in Japanese Laid-Open Patent Publication No. 6-267564, which comprises a fuel distributor plate having a fuel flow passage for supplying the fuel to the anode electrode, and an oxygen-containing gas distributor plate having an oxygen-containing gas flow passage for supplying the oxygen-containing gas to the cathode electrode, wherein at least one of the depth and the width of the oxygen-containing gas flow passage of the oxygen-containing gas distributor plate is gradually decreased from the upstream flow passage zone to the downstream flow passage zone of the oxygen-containing gas.

However, in order to sufficiently supply the fuel gas and the oxygen-containing gas to the electrode surface, the gas flow passage is provided in a meandering manner or in a circumscribing manner in the surface direction of the separator. For this reason, the gas flow passage is considerably lengthy in the surface of the separator. In the case of the conventional technique described above, the depth is large in the upstream flow passage zone of the oxygen-containing gas flow passage, and the separator itself is considerably thick-walled. Therefore, a problem is pointed out such that it is not easy to realize a small size of the entire fuel cell. Further, the conventional technique described above involves such a problem that the processing operation for gradually decreasing the depth from the upstream to the downstream of the gas flow passage is extremely complicated.

SUMMARY OF THE INVENTION

A principal object of the present invention is to provide a fuel cell stack which makes it possible to ensure appropriate gas diffusion performance and appropriate drainage performance and effectively realize a small size.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
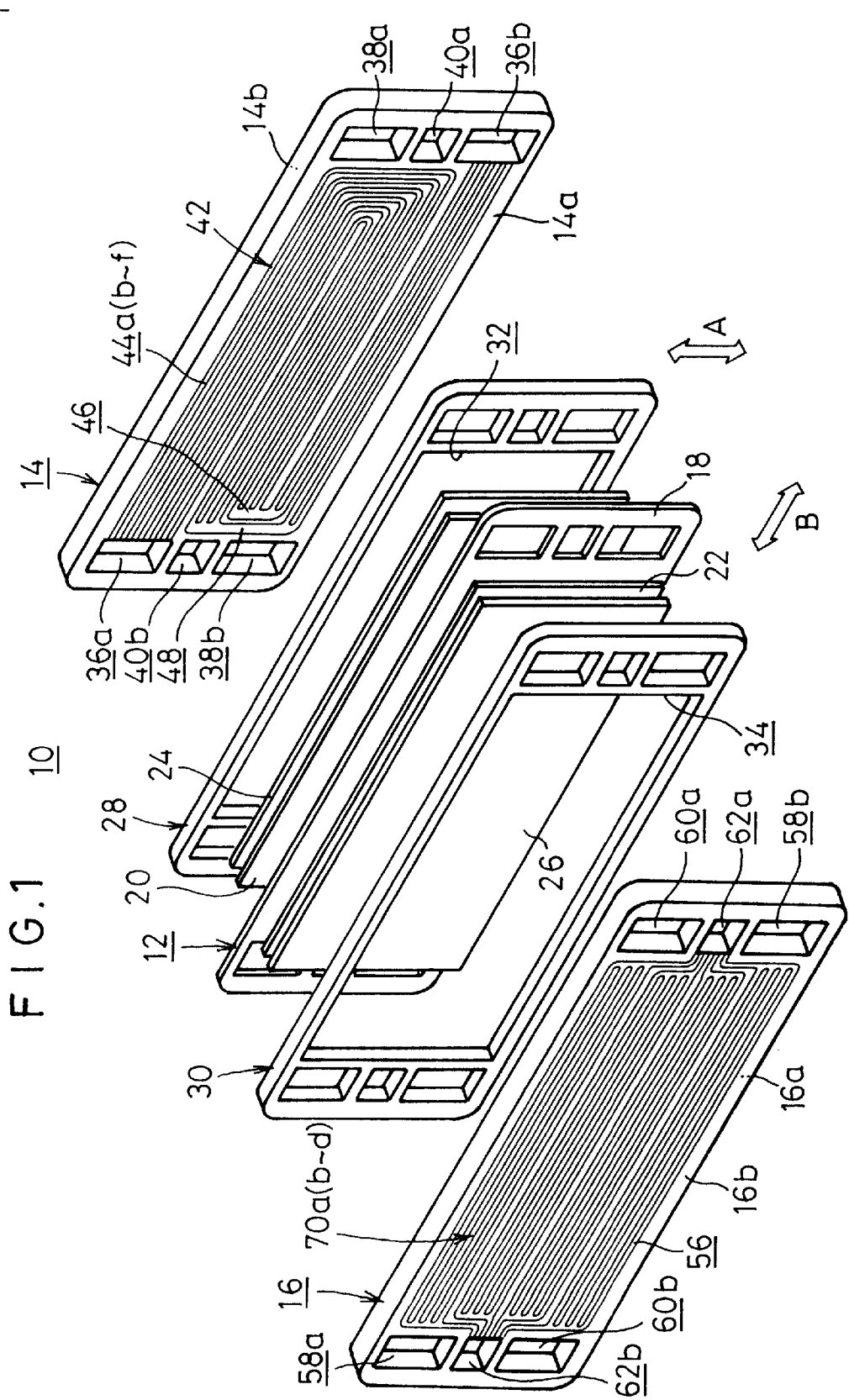
FIG. 1 shows an exploded perspective view illustrating major components of a fuel cell stack according to a first embodiment of the present invention.
Figure 2:
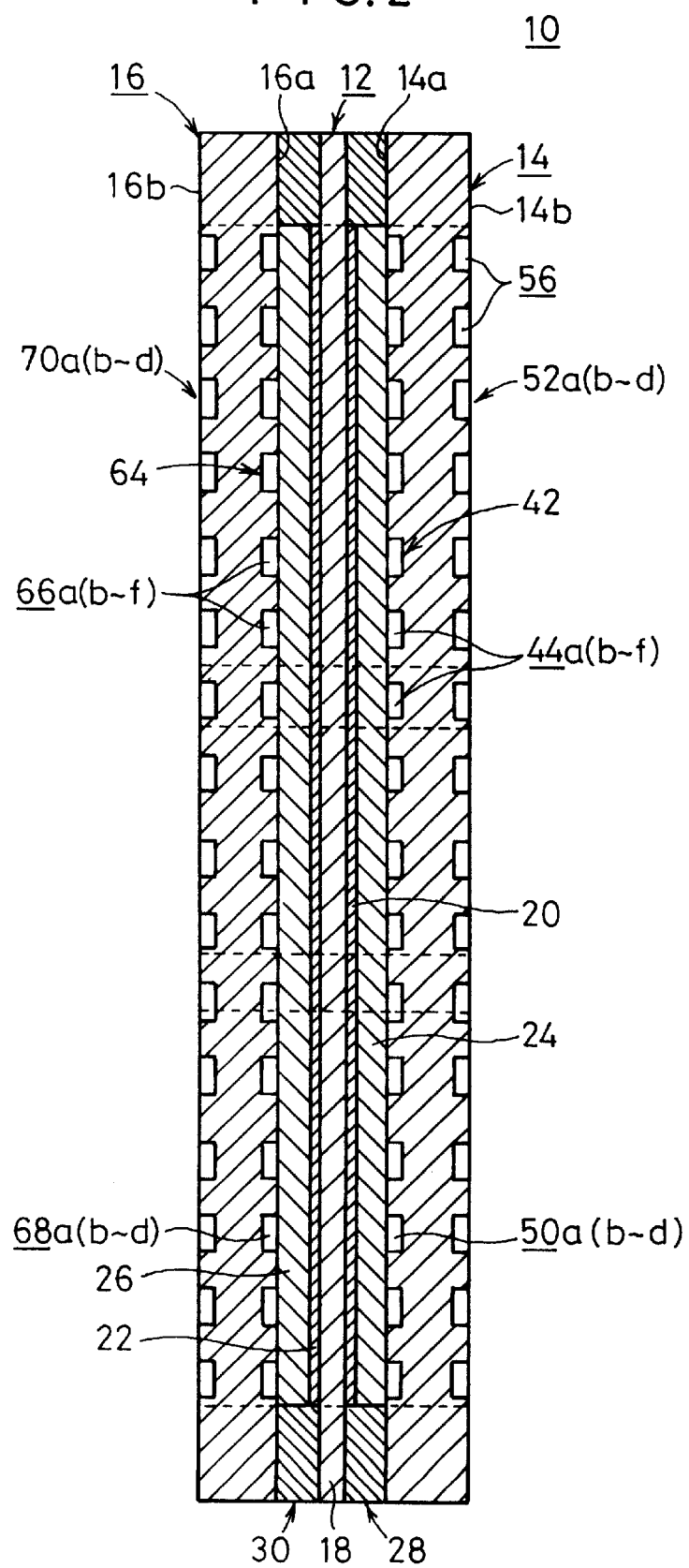
FIG. 2 shows a schematic longitudinal sectional view illustrating the fuel cell stack.

FIG. 1 shows an exploded perspective view illustrating major components of a fuel cell stack 10 according to a first embodiment of the present invention, and FIG. 2 shows a schematic longitudinal sectional view illustrating the fuel cell stack 10.

The fuel cell stack 10 comprises a fuel cell unit 12, and first and second separators 14, 16 for supporting the fuel cell unit 12 interposed therebetween. A plurality of sets of these components are optionally stacked with each other. The fuel cell stack 10 has a rectangular parallelepiped-shaped configuration as a whole. For example, the fuel cell stack 10 is arranged such that the short side direction (direction of the arrow A) is directed in the direction of the gravity, and the long side direction (direction of the arrow B) is directed in the horizontal direction.

The fuel cell unit 12 includes a solid polymer ion exchange membrane 18, and an anode electrode 20 and a cathode electrode 22 which are arranged with the ion exchange membrane 18 intervening therebetween. First and second gas diffusion layers 24, 26, each of which is composed of, for example, porous carbon paper as a porous layer, are arranged for the anode electrode 20 and the cathode electrode 22.

First and second gaskets 28, 30 are provided on both sides of the fuel cell unit 12. The first gasket 28 has a large opening 32 for accommodating the anode electrode 20 and the first gas diffusion layer 24. The second gasket 30 has a large opening 34 for accommodating the cathode electrode 22 and the second gas diffusion layer 26. The fuel cell unit 12 and the first and second gaskets 28, 30 are interposed between the first and second separators 14, 16.

Figure 3:
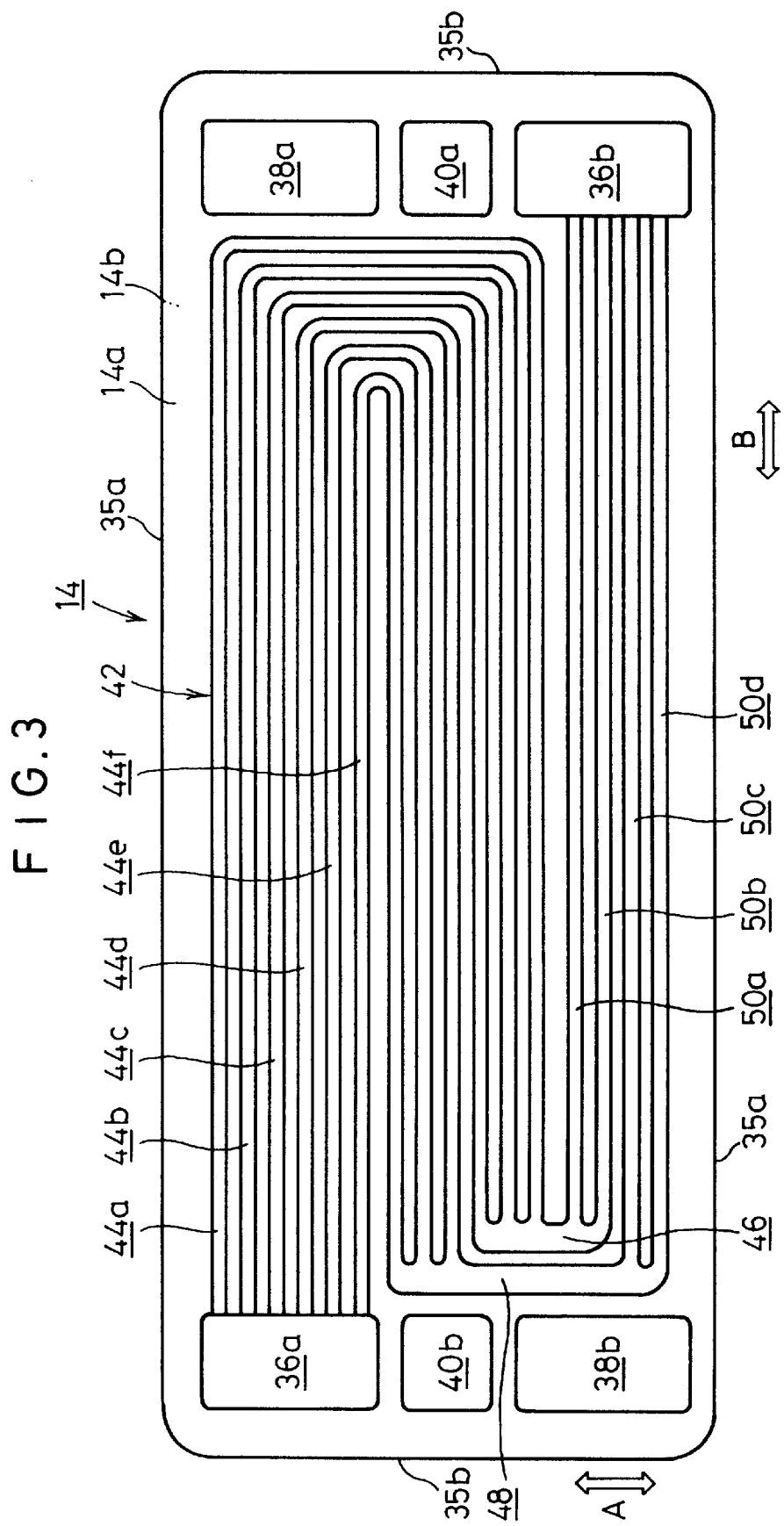
FIG. 3 shows a front view illustrating a first surface of a first separator for constructing the fuel cell stack.

As shown in FIGS. 1 and 3, the first separator 14 is designed such that each of the surface 14a opposed to the anode electrode 20 and the surface 14b on the opposite side has a rectangular configuration. For example, the first separator 14 is arranged such that the long side 35a is directed in the horizontal direction, and the short side 35b is directed in the direction of the gravity. The ratio of the long side 35a to the short side 35b is set, for example, to be about 1.5 to 3:1.

A fuel gas inlet 36a for allowing a fuel gas such as a hydrogen gas to pass therethrough, and an oxygen-containing gas inlet 38a for allowing an oxygen-containing gas as an oxygen gas or air to pass therethrough are provided at upper portions at the both end edges on the short side 35b of the first separator 14. A cooling medium inlet 40a and a cooling medium outlet 40b for allowing a cooling medium such as pure water, ethylene glycol, and oil to pass therethrough are provided at central portions at the both end edges on the short side 35b of the first separator 14. A fuel gas outlet 36b and an oxygen-containing gas outlet 38b are provided at diagonal positions with respect to the fuel gas inlet 36a and the oxygen-containing gas inlet 38a respectively at lower portions at the both end edges on the short side 35b of the first separator 14.

A fuel gas flow passage (fluid passage) 42, which communicates with the fuel gas inlet 36a and the fuel gas outlet 36b, is formed on the surface 14a of the first separator 14. The fuel gas flow passage 42 includes a plurality of, for example, six (2 m individuals of) of first gas flow passage grooves 44a to 44f. First ends of the first gas flow passage grooves 44a to 44f communicate with the fuel gas inlet 36a.

The first gas flow passage grooves 44a to 44f extend in the horizontal direction (direction of the arrow B) from the side of the fuel gas inlet 36a to the side of the oxygen-containing gas inlet 38a, and then they are bent in the downward direction (direction of the arrow A). Further, the first gas flow passage grooves 44a to 44f extend in the horizontal direction from the side of the cooling medium inlet 40a to the side of the cooling medium outlet 40b. In the vicinity of the cooling medium outlet 40b, the three (m individuals of) first gas flow passage grooves 44a to 44c are merged into a first united section 46. The remaining three (m individuals of) the first gas flow passage grooves 44d to 44f are merged into a second united section 48.

Two (n individuals of) second gas flow passage grooves 50a, 50b and 50c, 50d communicate with the first and second united sections 46, 48 respectively. The second gas flow passage grooves 50a to 50d extend in the horizontal direction, and they communicate with the fuel gas outlet 36b. The cross-sectional area of the flow passage of each of the first and second united sections 46, 48 is set to be equivalent to the total cross-sectional area of the flow passages of the second gas flow passage grooves 50a, 50b and 50c, 50d respectively.

Figure 4:
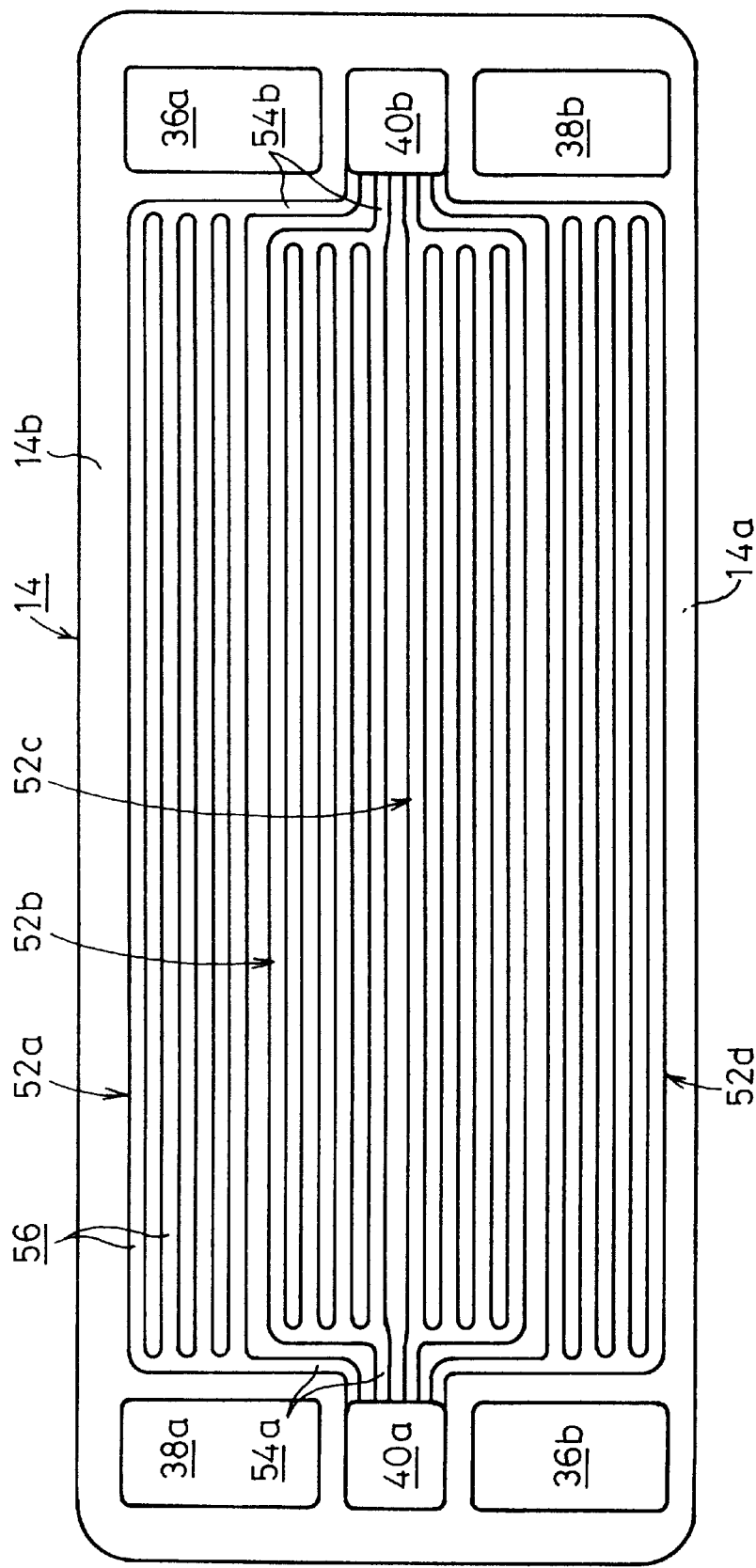
FIG. 4 shows a front view illustrating a second surface of the first separator.

As shown in FIG. 4, cooling medium flow passages (fluid passages) 52a to 52d, which communicate with the cooling medium inlet 40a and the cooling medium outlet 40b, are provided on the surface 14b on the side opposite to the surface 14a of the separator 14. Each of the cooling medium flow passages 52a to 52d includes single main flow passage grooves 54a, 54b which communicate with the cooling medium inlet 40a and the cooling medium outlet 40b respectively, and a plurality of, for example, four of branched flow passage grooves 56 which are provided between the main flow passage grooves 54a, 54b.

As shown in FIG. 1, the second separator 16 is formed to have a rectangular configuration. A fuel gas inlet 58a and an oxygen-containing gas inlet 60a are formed to make penetration at upper portions at the both end edges on the short side of the second separator 16. A cooling medium inlet 62a and a cooling medium outlet 62b are formed to make penetration at central portions at the both end edges of the second separator 16. A fuel gas outlet 58b and an oxygen-containing gas outlet 60b are formed to make penetration at diagonal positions with respect to the fuel gas inlet 58a and the oxygen-containing gas inlet 60a respectively at lower portions at the both end edges on the short side of the second separator 16.

As shown in FIG. 2, an oxygen-containing gas flow passage (fluid passage) 64, which makes communication between the oxygen-containing gas inlet 60a and the oxygen-containing gas outlet 60b, is formed on the surface 16a of the second separator 16 opposed to the cathode electrode 22. The oxygen-containing gas flow passage 64 includes first gas flow passage grooves 66a to 66f and second gas flow passage grooves 68a to 68d which are formed to make communication via unillustrated first and second united sections, in the same manner as the fuel gas flow passage 42, detailed explanation of which will be omitted.

As shown in FIG. 1, cooling medium flow passages 70a to 70d, which make communication between the cooling medium inlet 62a and the cooling medium outlet 62b, are formed on the surface 16b on the side opposite to the surface 16a of the second separator 16. The cooling medium flow passages 70a to 70d are constructed in the same manner as the cooling medium flow passages 52a to 52d which are provided for the first separator 14. The same constitutive components are designated by the same reference numerals, detailed explanation of which will be omitted.

The operation of the fuel cell stack 10 according to the first embodiment of the present invention constructed as described above will be explained below.

The fuel gas (for example, hydrogen-containing gas obtained by reforming hydrocarbon) is supplied to the inside of the fuel cell stack 10, and the air (or gas containing oxygen) as the oxygen-containing gas is supplied thereto. The fuel gas is introduced into the fuel gas flow passage 42 from the fuel gas inlet 36a of the first separator 14. As shown in FIG. 3, the fuel gas, which is supplied to the fuel gas flow passage 42, is introduced into the first gas flow passage grooves 44a to 44f, and it is moved in the direction of the gravity while meandering in the long side direction (direction of the arrow B) of the surface 14a of the first separator 14.

During this process, the hydrogen-containing gas in the fuel gas passes through the first gas diffusion layer 24, and it is supplied to the anode electrode 20 of the fuel cell unit 12. The fuel gas, which is not used, passes through the first gas flow passage grooves 44a to 44f, and it is once introduced into the first and second united sections 46, 48, followed by being dispensed to the second gas flow passage grooves 50a to 50d to be supplied to the anode electrode 20 while moving in the direction of the arrow B. On the other hand, the residual fuel gas is discharged from the fuel gas outlet 36b.

In the first embodiment, the six (2 m individuals of) first gas flow passage grooves 44a to 44f communicate with the fuel gas inlet 36a. The first gas flow passage grooves 44a to 44f communicate with the four (2 n individuals of) second gas flow passage grooves 50a to 50d at the intermediate portion, and then they communicate with the fuel gas outlet 36b. Therefore, the number of grooves is reduced from the fuel gas inlet 36a to the fuel gas outlet 36b in the surface 14a of the first separator 14, making it possible to avoid the decrease in number of molecules per unit area which would be otherwise caused by gas consumption, and increase the gas flow rate on the side of the fuel gas outlet 36b. Accordingly, the reaction product water, which is produced in the vicinity of the fuel gas outlet 36b, can be effectively discharged to the fuel gas outlet 36b owing to the increase in the gas flow rate. Thus, it is possible to improve the drainage performance.

The first and second united sections 46, 48 are provided at the merged portions of the first gas flow passage grooves 44a to 44f and the second gas flow passage grooves 50a to 50d. Accordingly, the fuel gas, which is supplied along the first gas flow passage grooves 44a to 44c and 44d to 44f, is once introduced into the first and second united sections 46, 48. Therefore, the gas turbulence is brought about at the first and second united sections 46, 48. It is possible to obtain such an effect that the hydrogen-containing gas in the fuel gas can be effectively diffused and supplied to the anode electrode 20. Further, the fuel gas, which is discharged from the three first gas flow passage grooves 44a to 44c, is merged at the first united section 46, and then it is dispensed to the two second gas flow passage grooves 50a, 50b. Accordingly, it is advantageous that the fuel gas is uniformly dispensed between the two second gas flow passage grooves 50a, 50b. The same advantage is also obtained by the other two second gas flow passage grooves 50c, 50d.

The two flow passage grooves (second gas flow passage grooves 50a, 50b and 50c, 50d) communicate with the first and second united sections 46, 48 respectively. Therefore, even if one flow passage groove is closed, for example, due to the dew formation of the product water, the fuel gas is allowed to smoothly flow through the other flow passage groove. Accordingly, it is possible to avoid the increase of the excessive concentration voltage which would be otherwise caused by any shortage of gas supply in the surface 14a of the first separator 14. Thus, it is advantageous that the fuel cell stack 10 can be operated stably.

In this arrangement, the flow passage cross-sectional area of each of the first and second united sections 46, 48 is set to be equivalent to the total flow passage cross-sectional area of the second gas flow passage grooves 50a, 50b and 50c, 50d as the dispensing sections respectively. Accordingly, the fuel gas can be smoothly fed from the first and second united sections 46, 48 to the second gas flow passage grooves 50a to 50d.

Further, the flow direction is inverted at the first and second united sections 46, 48 between the first gas flow passage grooves 44a to 44f and the second gas flow passage grooves 50a to 50d. Therefore, an effect is obtained such that the flow passages can be arranged without any gap with respect to the power generation surface in the surface 14a of the first separator 14.

In the second separator 16, the air, which is supplied from the oxygen-containing gas inlet 60a to the oxygen-containing gas flow passage 64, is moved in the direction of the gravity while meandering in the horizontal direction along the surface 16a. During this process, the oxygen gas in the air is supplied from the second gas diffusion layer 26 to the cathode electrode 22 in the same manner as the fuel gas supplied to the fuel gas flow passage 42. On the other hand, the air, which is not used, is discharged from the oxygen-containing gas outlet 60b.

The cooling medium is also supplied to the fuel cell stack 10. The cooling medium is supplied to the cooling medium inlets 40a, 62a of the first and second separators 14, 16. As shown in FIG. 4, the cooling medium, which is supplied to the cooling medium inlet 40a of the first separator 14, is introduced into the respective main flow passage grooves 54a which constitute the cooling medium flow passages 52a to 52d. The cooling medium flows in the upward direction, in the horizontal direction, and in the downward direction along the main flow passage grooves 54a. The cooling medium is introduced into the plurality of branched flow passage grooves 56 branched from the respective main flow passage grooves 54a. The cooling medium flows in the horizontal direction substantially over the entire surface of the surface 14b along the branched flow passage grooves 56, it passes through the main flow passage grooves 54b into which the branched flow passage grooves 56 merge, and it is discharged from the cooling medium outlet 40b.

On the other hand, as shown in FIG. 1, the cooling medium, which is supplied to the cooling medium inlet 62a of the second separator 16, passes through the cooling medium flow passages 70a to 70d, and it is moved linearly substantially over the entire surface of the surface 16b. After that, the cooling medium is discharged from the cooling medium outlet 62b.

Figure 5:
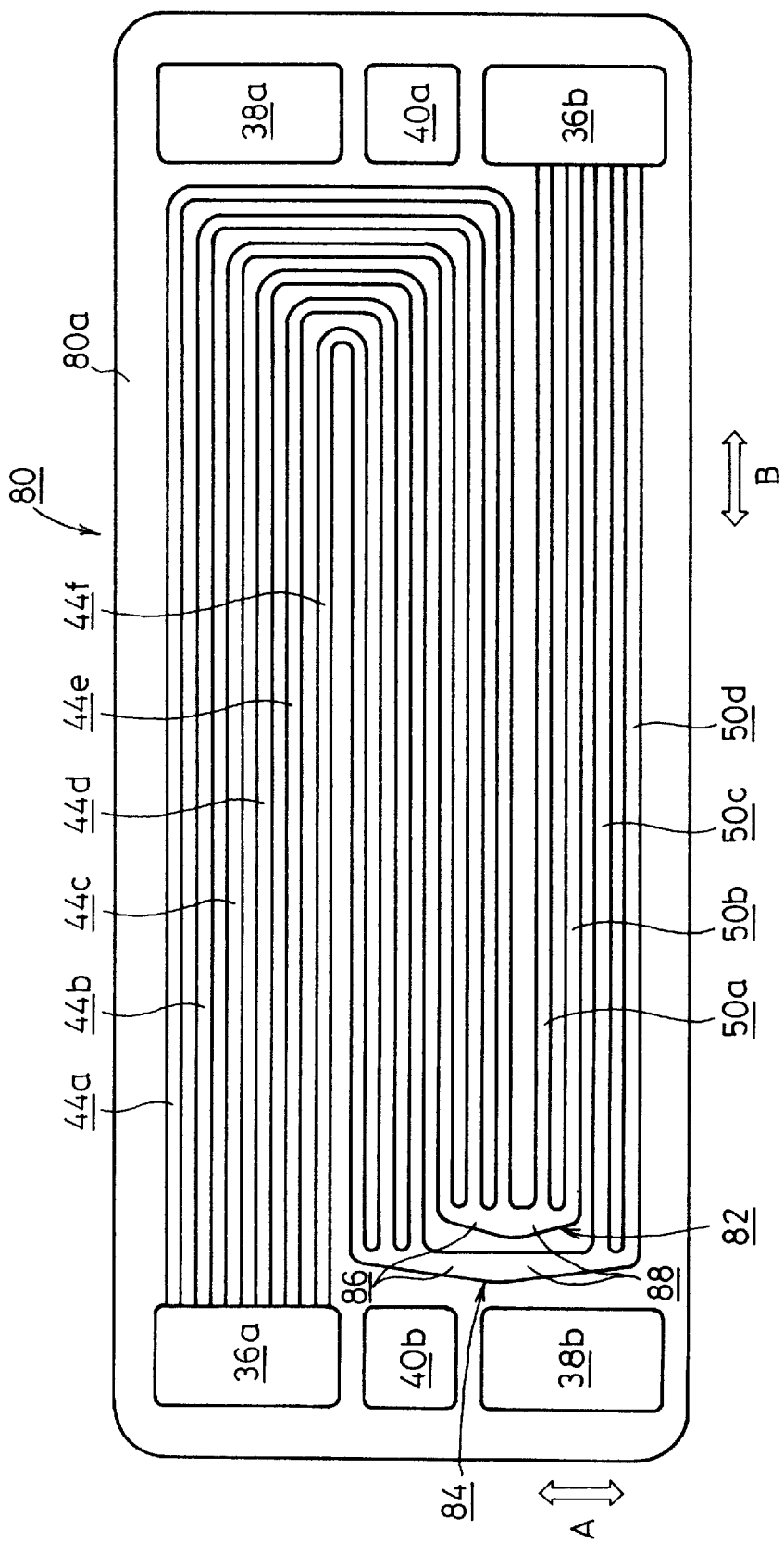
FIG. 5 shows a front view illustrating a first surface of a first separator for constructing a fuel cell stack according to a second embodiment of the present invention.
Figure 6:
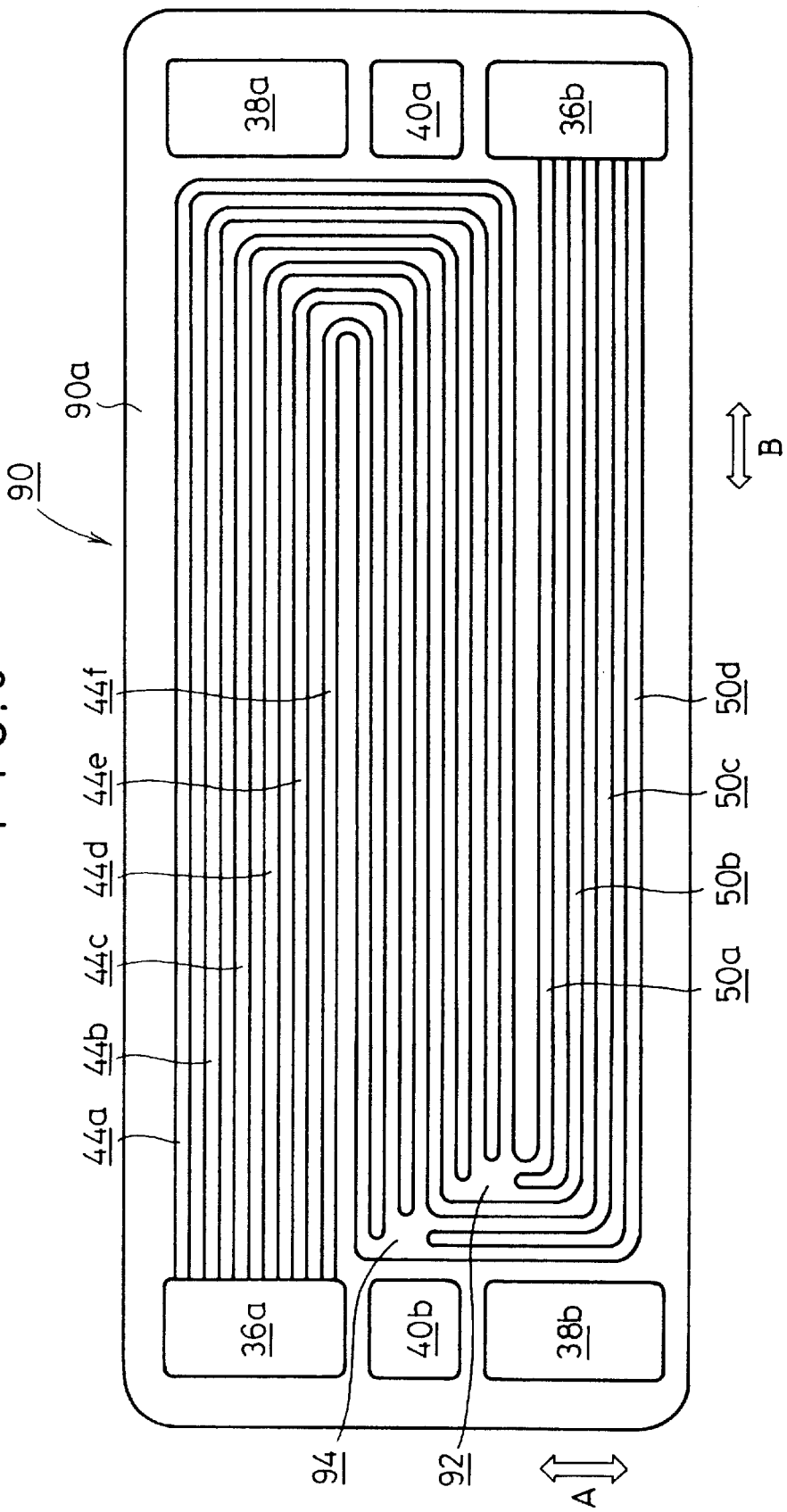
FIG. 6 shows a front view illustrating a first surface of a first separator for constructing a fuel cell stack according to a third embodiment of the present invention.

FIG. 5 shows a front view illustrating a first surface of a first separator 80 for constructing a fuel cell stack according to a second embodiment of the present invention, and FIG. 6 shows a front view illustrating a first surface of a first separator 90 for constructing a fuel cell stack according to a third embodiment of the present invention. The same constitutive components as those of the first separator 14 for constructing the fuel cell stack 10 according to the first embodiment described above are designated by the same reference numerals, detailed explanation of which will be omitted.

As shown in FIG. 5, a surface 80a of the first separator 80 according to the second embodiment is provided with first gas flow passage grooves 44a to 44f which communicate with a fuel gas inlet 36a, and second gas flow passage grooves 50a to 50d which communicate with a fuel gas outlet 36b. First and second united sections 82, 84 are formed at merged portions of the first gas flow passage grooves 44a to 44f and the second gas flow passage grooves 50a to 50d.

The first united section 82 has a first triangular section 86 with its flow passage cross-sectional area which is gradually increased from the portion of communication with the first gas flow passage groove 44c to the portion of communication with the first gas flow passage grooves 44b, 44a (in the downstream direction). A second triangular section 88, which has its flow passage cross-sectional area gradually decreasing toward the second gas flow passage grooves 50a, 50b, is provided on the lower side of the first triangular section 86. The second united section 84 is constructed in the same manner as the first united section 82 described above. The same constitutive components are designated by the same reference numerals, detailed explanation of which will be omitted.

The first separator 80 constructed as described above is operated as follows. That is, when the fuel gas, which is supplied to the first gas flow passage grooves 44a to 44f, is introduced into the first and second united sections 82, 84, the flow passage cross-sectional area is increased as the fuel gas merging into the first and second united sections 82, 84 is increased. On the other hand, the flow passage cross-sectional area of the first and second united sections 82, 84 is decreased as the fuel gas is dispensed from the first and second united sections 82, 84 to the second gas flow passage grooves 50a to 50d.

Accordingly, the fuel gas is uniformly and smoothly gathered from the first gas flow passage grooves 44a to 44f to the first and second united sections 82, 84. The fuel gas is smoothly and uniformly dispensed from the first and second united sections 82, 84 to the second gas flow passage grooves 50a to 50d. Accordingly, an effect is obtained such that the distribution of the fuel gas is efficiently performed.

As shown in FIG. 6, a surface 90a of the first separator 90 according to the third embodiment is provided with first and second united sections 92, 94 corresponding to merged portions of first gas flow passage grooves 44a to 44f and second gas flow passage grooves 50a to 50d. The first and second united sections 92, 94 are substantially triangular. The flow passage cross-sectional area is increased as the first gas flow passage grooves 44a to 44f are merged (in the downward direction).

Accordingly, in the third embodiment, the same effect as that of the second embodiment is obtained, for example, such that the fuel gas passes through the first gas flow passage grooves 44a to 44f, and it is smoothly and uniformly merged into the first and second united sections 92, 94.

The first to third embodiments are constructed such that the direction of the flow is inverted between the first gas flow passage grooves 44a to 44f and the second gas flow passage grooves 50a to 50d for constructing the fuel gas flow passage 42. However, as shown in FIGS. 7 and 8, it is also preferable that fuel gas flow passages 100, 110, which has the same direction of flow, are used.

Figure 7:
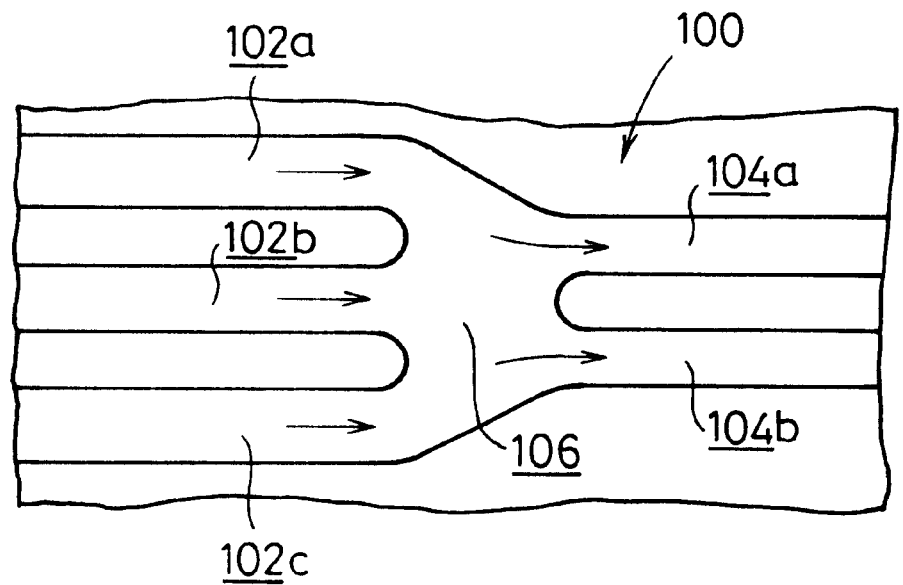
FIG. 7 illustrates parts of fuel gas flow passages in the case of an identical flow direction.

In the case of the fuel gas flow passage 100, as shown in FIG. 7, first gas flow passage grooves 102a to 102c and second gas flow passage grooves 104a, 104b are merged at a united section 106. The united section 106 is constructed such that the both sides are narrowed in the same flow direction after the first gas flow passage grooves 102a to 102c are once merged to dispense the fuel gas to the second gas flow passage grooves 104a, 104b.

Figure 8:
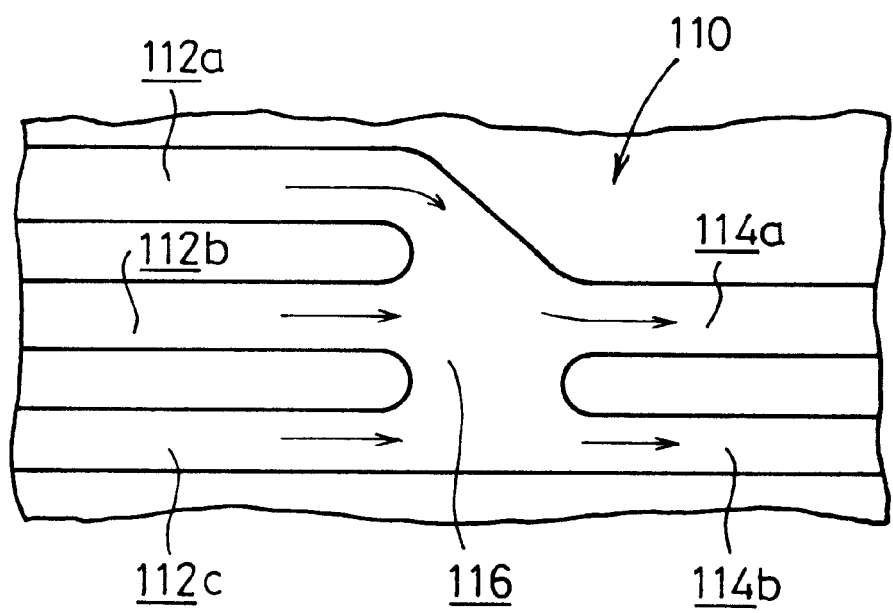
FIG. 8 illustrates parts of other fuel gas flow passages in the case of an identical flow direction.

As shown in FIG. 8, in the case of the fuel gas flow passage 110, a united section 116 is provided at a merged portion of first gas flow passage grooves 112a to 112c and second gas flow passage grooves 114a, 114b. The first gas flow passage grooves 112b, 112c and the second gas flow passage grooves 114a, 114b are arranged on identical straight lines.

In the case of the fuel gas flow passages 100, 110, the respective three of (m individuals of) the first gas flow passage grooves 102a to 102c and 112a to 112c are once collected into the single united sections 106, 116, when they are throttled into the two of (n individuals of) the second gas flow passage grooves 104a, 104b and 114a, 114b respectively. Accordingly, it is possible to generate the turbulence in the fuel gas. It is possible to effectively improve the diffusion performance of the reaction gas to the electrode surface. Further, the fuel gas, which is discharged from the respective three first gas flow passage grooves 102a to 102c, 112a to 112c, is merged at the united sections 106, 116, and then it is dispensed to the respective two second gas flow passage grooves 104a, 104b, 114a, 114b. Accordingly, it is advantageous that the fuel gas is uniformly dispensed between the respective two second gas flow passage grooves 104a, 104b and 114a, 114b.

Figure 9:
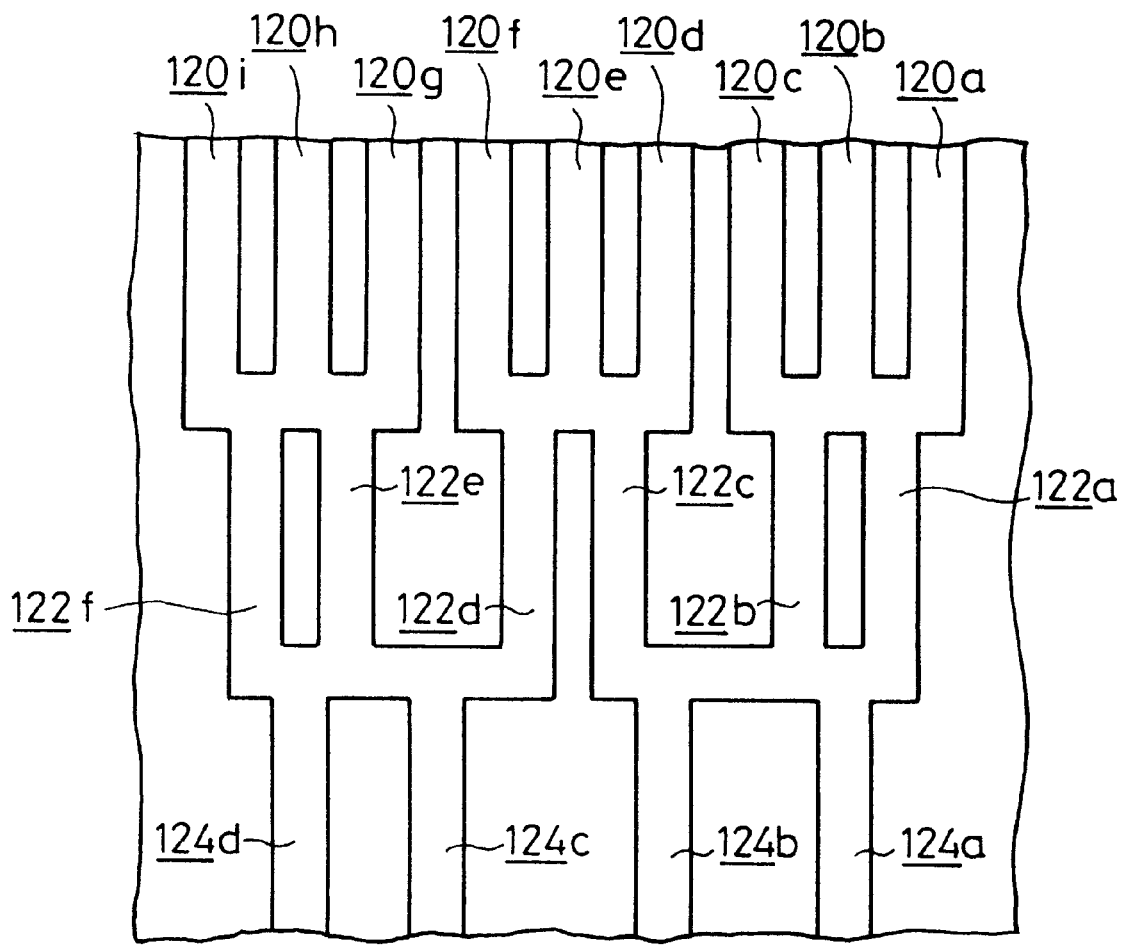
FIG. 9 illustrates an arrangement in which three flow passage grooves are throttled into two at two stages.

The foregoing description is basically directed to the case in which the three flow passage grooves are throttled into the two flow passage grooves. However, in some cases, three individuals are throttled into two at two stages in the surface of the separator. This arrangement will be described with reference to FIG. 9. First gas flow passage grooves 120a to 120i are provided on the inlet side. The first gas flow passage grooves 120a to 120c are throttled into second gas flow passage grooves 122a, 122b. The first gas flow passage grooves 120d to 120f are throttled into second gas flow passage grooves 122c, 122d. The first gas flow passage grooves 120g to 120i are throttled into second gas flow passage grooves 122e, 122f. The second gas flow passage grooves 122a to 122c are throttled into third gas flow passage grooves 124a, 124b. The second gas flow passage grooves 122d to 122f are throttled into third gas flow passage grooves 124c, 124d.

In addition to the method in which the number of grooves is throttled from three into two, a variety of throttling methods are adopted, including, for example, a method in which the number of grooves is throttled into four, three, and two, and a method in which the number of grooves is throttled into six, four, and three. Accordingly, it is possible to freely adjust the pressure loss in the surface of the separator. It is possible to improve the degree of freedom of design concerning the water drainage performance and the fluid distribution in the stack.

In the fuel cell stack according to the present invention, the fluid passage for allowing the fluid containing the fuel gas and/or the oxygen-containing gas to flow therethrough includes m individuals of first gas flow passage grooves disposed on the gas inlet side, and n individuals of (m>n) second gas flow passage grooves disposed on the gas outlet side. The united section is provided at the merged portion of the first and second gas flow passage grooves as a whole. Accordingly, it is possible to effectively avoid the decrease in gas flow rate when the fluid flowing from the gas inlet side to the gas outlet side is consumed. Further, the gas turbulence is brought about at the united section, and it is possible to improve the gas diffusion performance to the electrode surface. Since the flow rate is prevented from any decrease, the water drainage performance is effectively improved, and it is possible to avoid the decrease in the power generation performance which would be otherwise caused by the condensation of water on the electrode reaction surface. The fuel gas and/or the oxygen-containing gas, which is discharged from the plurality of first gas flow passage grooves, is merged at the united section, and then it is dispensed to the plurality of second gas flow passage grooves. Accordingly, the gas is uniformly dispensed between the plurality of second gas flow passage grooves.

What is claimed is:

1. A fuel cell stack comprising a plurality of fuel cell units each composed of an electrolyte interposed between an anode electrode and a cathode electrode, said plurality of fuel cell units being stacked with separators intervening therebetween, wherein:

a fluid passage for allowing a fluid to flow therethrough is provided in a surface of said separator, said fluid containing at least any one of a fuel gas to be supplied to said anode electrode and an oxygen-containing gas to be supplied to said cathode electrode, and said fluid passage including:

m individuals of first gas flow passage grooves formed on a side of a gas inlet provided that m is a natural number;

n individuals of second gas flow passage grooves formed on a side of a gas outlet provided that n is a natural number and there is given m>n; and a united section provided at a merged portion of said first gas flow passage grooves and said second gas flow passage grooves, for making communication between said m individuals of first gas flow passage grooves and said n individuals of second gas flow passage grooves in an integrated manner.

2. The fuel cell stack according to claim 1, wherein said second gas flow passage grooves are arranged as two or more individuals.

3. The fuel cell stack according to claim 1, wherein a flow direction is inverted at said united section between said first gas flow passage grooves and said second gas flow passage grooves.

4. The fuel cell stack according to claim 3, wherein said united section has a fluid passage cross-sectional area which is set to be equivalent to a total flow passage cross-sectional area of said n individuals of second gas flow passage grooves.

5. The fuel cell stack according to claim 3, wherein said united section includes:

a first triangular section having a flow passage cross-sectional area which is increased toward a portion of communication with said first gas flow passage grooves; and a second triangular section having a flow passage cross-sectional area which is decreased toward a portion of communication with said second gas flow passage grooves.

6. The fuel cell stack according to claim 3, wherein said united section is designed to have a substantially triangular configuration in which a flow passage cross-sectional area is increased as said first gas flow passage grooves are merged.

7. The fuel cell stack according to claim 1, wherein said first gas flow passage grooves and said second gas flow passage grooves are disposed in an identical flow direction with said united section intervening therebetween.

8. The fuel cell stack according to claim 7, wherein said united section is designed to be narrowed from said first gas flow passage grooves to said second gas flow passage grooves.

* * * * *